D. FISHER.
Churn.
No. 7,870.
Patented Jan'y 1, 1851.
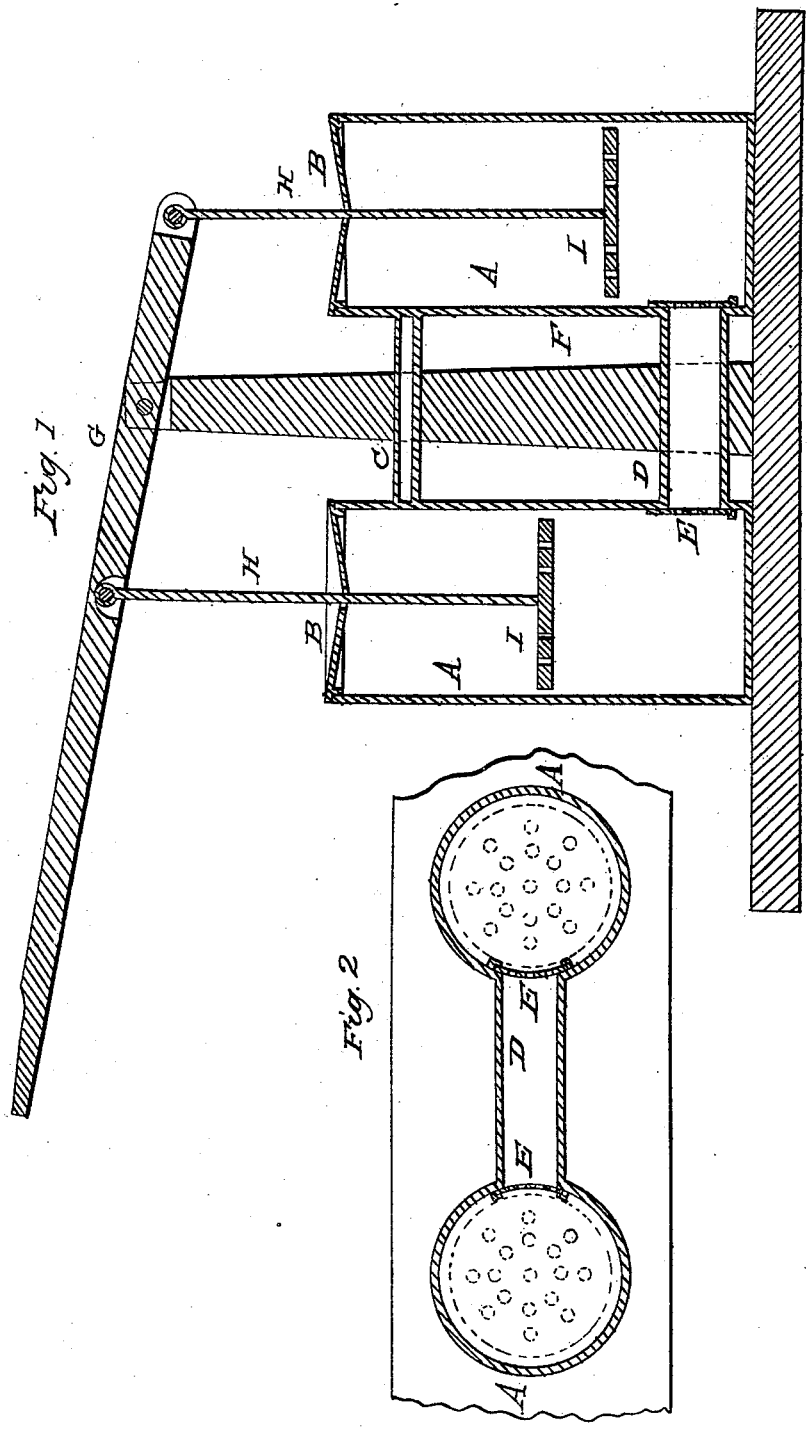

UNITED STATES PATENT OFFICE.

DANL. FISHER, OF COLLEGE CORNER, OHIO.

CHURN.

Specification of Letters Patent No. 7,870, dated January 1, 1851.

*To all whom it may concern:*

Be it known that I, DANIEL FISHER, of College Corner, in the county of Butler and State of Ohio, have invented a new and useful Improvement in the Churn for Churning Butter, which is described as follows, reference being had to the annexed drawings making part of this specification.

Figure 1 is a vertical longitudinal section of the improved churn. Fig. 2 is a horizontal section of ditto, showing the perforated pistons or plungers by dotted lines.

The same letters in the figures refer to similar parts.

The nature of my improvements consists in having a horizontal cylinder or tube connecting a double dasher churn, which is provided at each end with perforated plates or cutters. This tube or cylinder serves as a receptacle and condenser of air; the perforated cutters answer the double purpose of cutting the cream in its passage to and fro and only allowing sufficient cream to enter through the perforations at each stroke of the dashers to keep the tube half full or thereabout, thereby creating a partial vacuum in the tube, which becomes filled with air. When a rapid commotion is produced in the cream by the action of the dashers the air in the tube is forced to mingle with the cream and find its way out through the opposite end of the tube and from thence up through the cream in the churn.

I am aware that double dasher churns—where the cream has been forced from one compartment to the other—has been used, and I therefore confine myself to the improvement, to wit; the horizontal tube combined with the perforated cutters communicating the same with two upright churns described as follows.

To enable others skilled in the art to make and use my invention, I will proceed to describe its construction, and operation.

A, are the cylinders secured to a horizontal plank at any suitable distance apart, open at top and provided with movable covers B connected together at top by a tie C, and at bottom by a horizontal tube D, which I make about one fifth the capacity of the cylinders forming the churns through which they communicate with each other.

E, are upright segmental slides perforated with a series of openings to admit the passage of the cream, and inserted into grooves on the inner circumference of the cylinders immediately opposite the ends of the tube, D.

F, is an upright rising from the base on which the cylinders rest and extending above said cylinders and having ears at its upper end between which a lever G is suspended on a pin on which it moves as a fulcrum.

H, are rods attached to the lever G by pins at equal distances from the fulcrum, extending downward through openings in covers B into the cylinders and having perforated pistons or plungers I, secured to their lower ends.

The operation is as follows: The cylinders being filled to the proper height with cream, and the covers B placed over the same, the operator lays hold of the handle of the lever G and moves it up and down after the manner of operating a double cylinder pump, which causes the cream to be alternately forced through the openings in the segmental slides E and those in the pistons or plunger, I, thus agitating the cream in a great degree below the pistons, and causing it to be thrown up above the same, and the fatty substances contained therein to be exposed to the oxygen of the atmosphere and speedily converted into butter.

Having thus fully described the construction and operation of my improved double dasher churn what I claim therein as new and desire to secure by Letters Patent, is:

Connecting two vertical churns by a horizontal tube at their bottoms substantially as described, (said tube being about ten inches long, and about one fifth of the capacity of one of the vertical cylinders) in combination with the perforated cutters E E operating in the manner and for the purpose herein fully set forth.

DANIEL FISHER.

Attest:
CHRISTIAN EBY,
J. A. HARTER.